Jan. 1, 1924

L. H. SAMMONS

SIDE CURTAIN FOR VEHICLE TOPS

Filed Sept. 15, 1921

1,479,400

Inventor
Lonnie H. Sammons

By Hardway Cathy
Attorneys

Patented Jan. 1, 1924.

1,479,400

UNITED STATES PATENT OFFICE.

LONNY H. SAMMONS, OF HOUSTON, TEXAS.

SIDE CURTAIN FOR VEHICLE TOPS.

Application filed September 15, 1921. Serial No. 500,924.

*To all whom it may concern:*

Be it known that I, LONNY H. SAMMONS, a citizen of the United States, residing at Houston, in the county of Harris and State of Texas, have invented certain new and useful Improvements in Side Curtains for Vehicle Tops, of which the following is a specification.

This invention relates to new and useful improvements in side curtains for vehicle tops.

One object of the invention is to provide side curtains which may be readily unfolded or lowered into position for use, and when not in use may be folded up against the vehicle top out of the way.

Another object is to provide side curtains which may readily be brought into position to protect the occupants of the vehicle from rain, wind and sun and which may easily be applied to or detached from any type of vehicle top.

A further feature resides in the provision of side curtains which are of simple construction and consequently may be cheaply and easily manufactured.

With the above and other objects in view this invention has particular relation to certain novel features of construction, operation and arrangement of parts, an example of which is given in this specification and illustrated in the accompanying drawings, wherein:—

Referring now more particularly to the drawings the numeral 1 designates the top of an automobile of conventional form.

Figures 2, 3, 4:
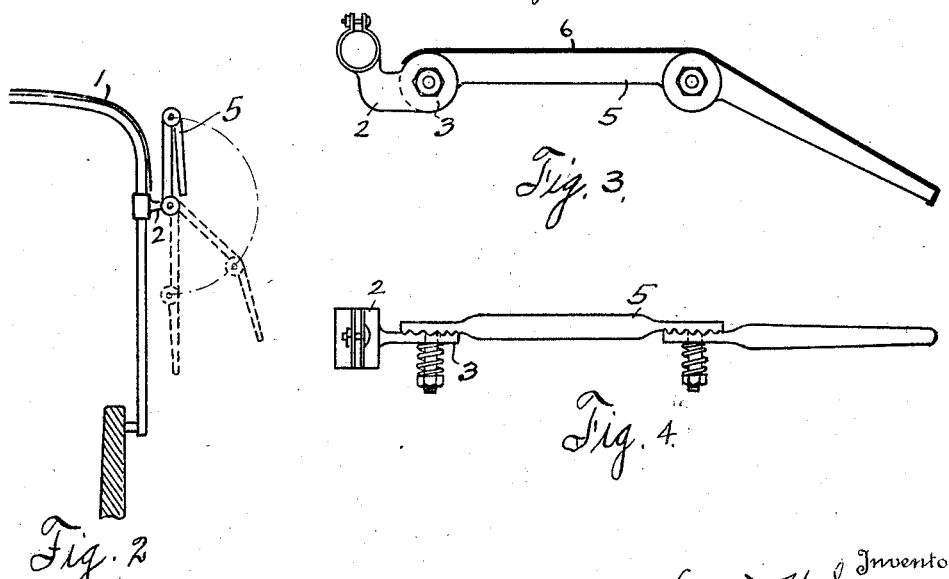
Figure 2 is a fragmentary front view thereof, partially in section.
Figure 3 shows an enlarged front end view of the curtain.
Figure 4 shows a plan view of one of the supporting arms, forming a framework of the curtain.

Fastened to the frame of the top are four brackets 2 each being formed with a hinge member 3. These brackets are of any suitable form and are readily detachable. Hinged to each bracket is a supporting arm 5, formed of two sections, hinged together. These hinges are shown in detail in Figure 4. They are the friction type so that the arms can be readily adjusted to any position and will be held by them fixed in said position.

The arms on each side form a supporting framework for the flexible covering 6 which is secured thereon in any suitable manner.

Figure 1:
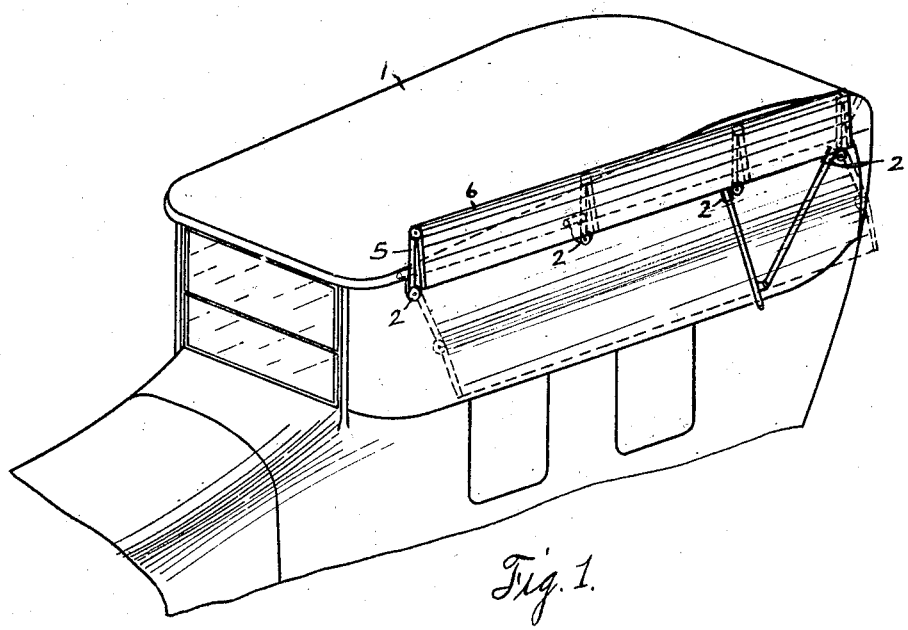
Figure 1 is a fragmentary perspective view of a motor vehicle with the side curtains applied to the top thereof.

When not in use the curtains are folded up closely against the sides of the top 1, as shown in Figure 1. When so desired they may be pulled downwardly to any angle, relative to the top, desired, and will thus protect the occupants of the vehicle from the sun and elements.

What I claim is:—

1. The combination with a vehicle top, of brackets thereon, arms hinged to said brackets, said arms comprising inner and outer sections hingedly connected together, the hinges between said sections and between said arms and said brackets being spring pressed friction joints whereby said arms may be automatically held in any adjusted position, and curtains on said arms.

2. The combination with a vehicle top, of brackets thereon, arms hinged to said brackets to swing thereon in a vertical plane, said arms comprising a plurality of sections hinged together, means to automatically retain said sections in adjusted position at any desired angle relative to each other and to said top and curtains on said arms and adapted to lie flat thereon.

3. The combination with a vehicle top, of arms pivoted to the side of said top to swing in vertical planes, spring joints at the pivots of said arms to retain said arms automatically at any adjusted angle relative to said top, each arm being separately adjustable, and a curtain supported on said arms.

4. The combination with a vehicle top, of brackets detachably secured to the side of the top frame, each bracket being formed with a hinge member, a series of arms comprising a plurality of sections pivotally secured together and hinged to said hinge members, the joints and hinges being formed to allow adjustment in a vertical plane, automatic means adapted to hold said arms in any adjusted position, and a curtain on said arms.

In testimony whereof I have signed my name to this specification in the presence of two subscribing witnesses.

LONNY H. SAMMONS.

Witnesses:
E. V. HARDWEN,
JAS. W. OLIVER.